US010962786B2

(12) United States Patent
Leighton et al.

(10) Patent No.: US 10,962,786 B2
(45) Date of Patent: Mar. 30, 2021

(54) OPTICAL WAVEGUIDE DEVICES, METHODS AND SYSTEMS INCORPORATING SAME

(71) Applicant: RPX CORPORATION, San Francisco, CA (US)

(72) Inventors: James Leighton, Canvey (GB); Brennon Pennell, Ashford (GB); Adrian Stannard, St Leonards-on-Sea (GB); Louahab Noui, Hartfield (GB); Nan Ma, Tonbridge (GB); Iain Wellington, Chatham (GB); Philip Greenhalgh, Battle (GB); Lawrence Hoar, Hartley (GB); Iain Wright, Tunbridge Wells (GB)

(73) Assignee: RPX CORPORATION, San Francisco, CA (US)

( * ) Notice: Subject to any disclaimer, the term of this patent is extended or adjusted under 35 U.S.C. 154(b) by 0 days.

(21) Appl. No.: 16/658,078

(22) Filed: Oct. 19, 2019

(65) Prior Publication Data

US 2020/0049998 A1   Feb. 13, 2020

Related U.S. Application Data

(63) Continuation of application No. 15/893,599, filed on Feb. 10, 2018, now Pat. No. 10,488,666.

(51) Int. Cl.
*G02B 27/01* (2006.01)
*F21V 8/00* (2006.01)

(52) U.S. Cl.
CPC ....... *G02B 27/0172* (2013.01); *G02B 6/0035* (2013.01); *G02B 2027/0178* (2013.01)

(58) Field of Classification Search
CPC .. G02B 6/0035; G02B 6/0036; G02B 6/0038; G02B 27/01–0189; G02B 17/006; G02B 2027/0105–0198
See application file for complete search history.

(56) References Cited

U.S. PATENT DOCUMENTS

| 2007/0091445 A1* | 4/2007 | Amitai | G02B 6/0056 359/630 |
| 2009/0279180 A1* | 11/2009 | Amitai | G02B 13/22 359/633 |
| 2010/0177388 A1* | 7/2010 | Cohen | G02B 6/0038 359/566 |

* cited by examiner

*Primary Examiner* — Christina A Riddle
*Assistant Examiner* — Christopher A Lamb, II
(74) *Attorney, Agent, or Firm* — Franklin & Associates International Inc; Matthew F. Lambrinos

(57) ABSTRACT

An optical device includes a range of angularly selective reflectors are contained within an optical waveguide substrate and substantially optimized according to their reflector order within the sequence of reflectors. This configuration of reflectors ensures that the required angular information is passed through to the correct reflector within the sequence. The angular response in addition reduces or eliminates formation of secondary images carried to successive reflectors, resulting in undesired artefacts.

20 Claims, 14 Drawing Sheets

OPTICAL WAVEGUIDE DEVICES, METHODS AND SYSTEMS INCORPORATING SAME

This application is a continuation of U.S. non-provisional application Ser. No. 15/893,599, filed Feb. 10 2018, which is hereby incorporated herein by reference in its entirety to provide continuity of disclosure.

TECHNICAL FIELD

Embodiments relate to optical devices and systems. More particularly but not exclusively, embodiments relate to optical waveguide devices and systems for optical delivery systems. Furthermore, some embodiments relate to optical waveguide combiner devices for display imaging systems such as augmented reality display systems. Yet furthermore, some embodiments relate to methods of determining the required optical response of components of such optical waveguide devices.

BACKGROUND

An optical waveguide is an optical medium that is configured to guide electromagnetic waves in the optical spectrum. Optical waveguides are used in optical delivery systems for imaging applications and non-imaging applications. For example, optical waveguides are utilized in optical delivery systems for imaging applications such as but not limited to augmented reality display systems.

There is a need to provide improved optical waveguide devices and systems that have better performance than those of current optical delivery systems.

SUMMARY

According to one aspect of the present technology, there is provided an optical device. The optical device can comprise an optical waveguide substrate and a plurality of reflectors spatially distributed in a sequence along a propagation axis of the optical waveguide substrate. The plurality of reflectors can comprise a plurality of angular selective notch filter optical reflectors. Each angular selective notch filter optical reflector can be configured both to partially reflect and partially transmit light rays having angles of incidence with respect to the reflector which are in a specific transflectance band of angles selected for the particular reflector and to pass or transmit, without reflection or with reduced reflection light rays that have angles of incidence above and below the selected specific transflectance band. The specific transflectance band of each angular selective notch filter optical reflector can be selected according to the reflector order of the reflector within the sequence of the reflectors in said optical waveguide substrate.

According to another aspect of the present technology, an optical system is provided. The optical system can comprise an augmented reality display optical combiner. The optical combiner can comprise an optical waveguide substrate and a plurality of reflectors spatially distributed in a sequence along a propagation axis of said optical waveguide substrate.

The plurality of reflectors can comprise a plurality of angular selective notch filter optical reflectors.

Each angular selective notch filter optical reflector can be configured both to partially reflect and partially transmit light rays having angles of incidence with respect to the reflector which are in a specific transflectance band of angles selected for the particular reflector and to generally pass or transmit, without reflection or with minimized or reduced reflection, light rays that have angles of incidence above and below the selected specific transflectance band.

The specific transflectance band of each angular selective notch filter optical reflector can be selected according to the order of the reflector within the sequence of the reflectors in the optical waveguide substrate.

According to yet another aspect, a method of determining the optical profiles of the reflectors of the optical device is provided. The method can comprise a computer-implemented simulation method. The computer simulation method may comprise: designating in the computer an optical device waveguide substrate properties including geometry; defining in the computer a plurality of reflectors spatially distributed in a sequence along the optical waveguide substrate; for each reflector, designating surface properties and associating the surface properties with the reflector within the waveguide substrate; simulating a light ray source at the eye-box plane; reverse-tracing light rays from the light ray source into the optical waveguide; based on the defined reflector surface properties and the waveguide geometry, determining the angles of incidence of the light rays from the eye-box light source that are directly and indirectly incident on the reflectors; and determining the optimized or required selective notch filter angular response characteristic of each reflector according to the determined angles of incidence of the rays directly and indirectly incident on the reflectors.

According to yet another aspect, a method of forming the optical device of any one of the embodiments is provided. The method can comprise providing the required or optimized selective notch filter angular response reflectors; providing optical waveguide material; and spatially distributing the selective notch filter angular response reflectors in a sequence along a substrate formed from the optical waveguide material. The step of providing the required or optimized selective notch filter angular response reflectors can comprise forming each one of the plurality of selective notch filter angular response reflectors with a required optical profile. The step of providing the required or optimized selective notch filter angular response reflectors can further comprise the method of determining the required or optimized optical profiles of each one of the selective notch filter angular response reflectors by the computer-implemented simulation method. The step of forming the optimized or required selective notch filter angular response reflectors can further comprise forming each one of the plurality of selective notch filter angular response reflectors with a required optical profile pre-determined by the computer-implemented simulation method.

In some embodiments of the aforementioned methods, the selective notch filter angular response reflectors are multi-layer dielectric coatings. In some embodiments of the aforementioned methods, the optical devices are augmented reality optical combiners which, in some embodiments, are near-ear augmented reality optical combiners.

BRIEF DESCRIPTION OF THE DRAWINGS

In order that the present invention may be more readily understood, reference will now be made to the accompanying drawings, in which.

DETAILED DESCRIPTION OF PREFERRED EMBODIMENTS

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Applicant has identified important drawbacks of optical waveguides used in optical delivery systems that contribute to inefficiencies when relaying an image to the eye and that result in one or more undesirable effects, such as reduction in observed luminance. There is a need to improve propagation efficiencies in optical delivery systems for imaging applications, as well as in optical delivery systems for non-imaging applications. Some examples of optical delivery systems for imaging applications that exhibit propagation inefficiencies include, but are not limited to, augmented reality displays and, in particular, near-eye augmented reality displays which enable the user to view superimposed virtual content through a transparent or semi-transparent display. One example of a near-eye augmented reality display comprises an image-producing display engine and an optical waveguide combiner that transmits the image into the user's eye via a partially optically transparent and partially optically reflective substrate.

Figure 1:
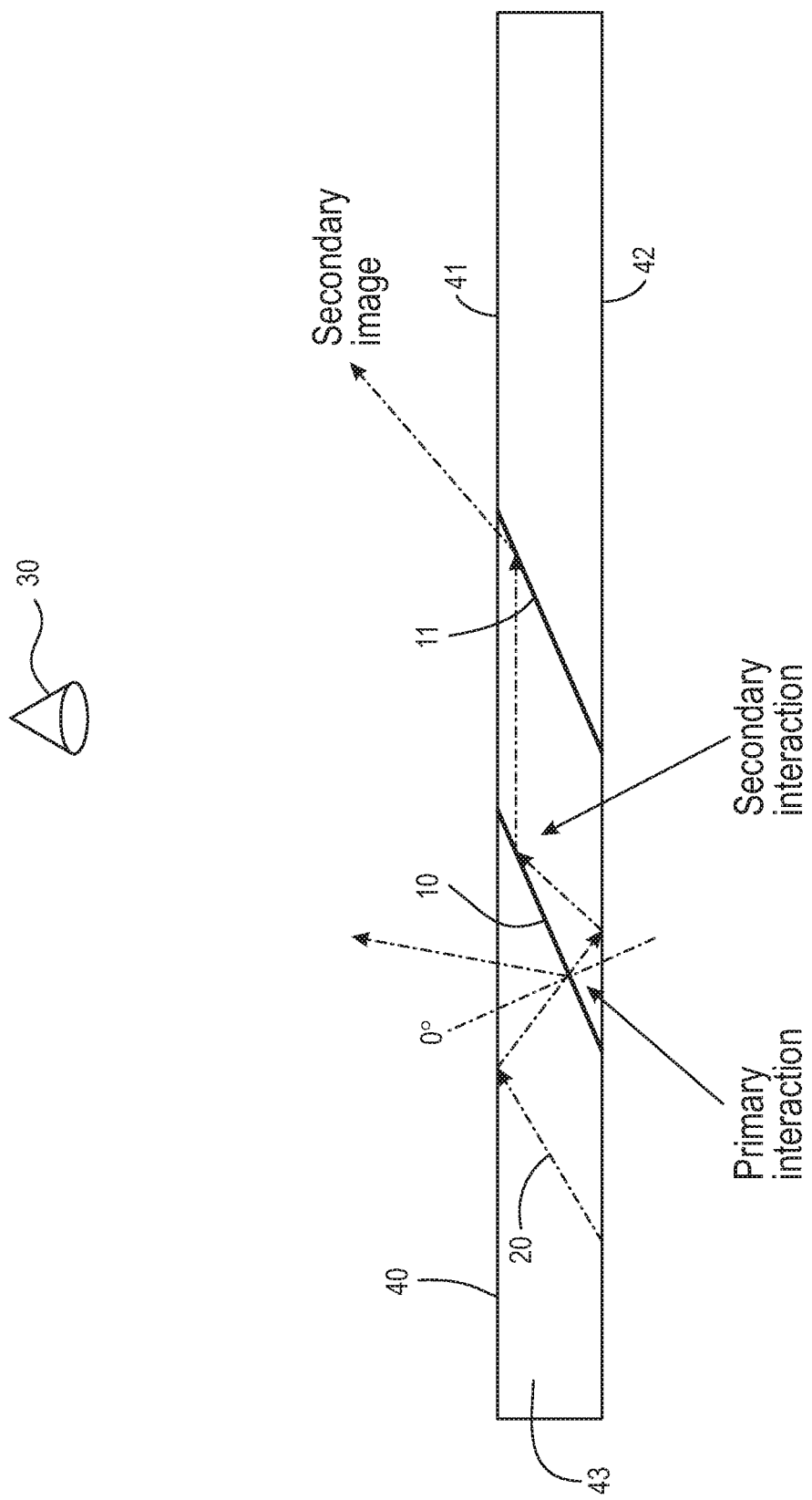
FIG. 1 illustrates optical problems with a conventional optical waveguide combiner.

FIG. 1 illustrates how optical characteristics associated with the propagation of light rays through an optical waveguide combiner can cause problems in near-eye augmented reality displays. An optical combiner is formed from an optically transparent waveguide substrate 40 containing a plurality of reflectors 10, 11. Optical image ray 20 from a display source (not shown) enters an optical receiving end or side 43 of substrate 40 and propagates through the substrate. For the sake of clarity, only two embedded reflecting surfaces 10, 11 (reflectors) are shown in FIG. 1 but there may be more than two reflectors. The waveguide substrate 40 is configured to guide the image light rays 20 by reflecting light rays back and forth between two opposing faces 41, 42 of substrate 40 when an angle of incidence between the propagation direction of light ray 20 and the normal, or perpendicular direction, to the opposing faces is greater than the critical angle. The critical angle depends on the index of refraction of the materials. For ease of illustration, only a single light ray 20 is shown but there are countless other rays that bounce along the waveguide.

Any image light rays guided by substrate 40 that have an angle of incidence with respect to opposing faces 41, 42 that is below the critical angle will pass or transmit through the face 41, 42 and out of the waveguide rather than being totally reflected. Optical rays (not shown) entering the substrate rear face 42 with an angle of incidence below the critical angle pass through the substrate material and exit from the substrate front face 41. An eye 30 of an observer located on one side of the substrate and looking through the front face 41 of the substrate can see through the substrate material and observe objects, scenes etc. located on the other side of the substrate. The area whereby the full field-of-view of an image formed by the optical device is viewable by the eye when moved around relative to the optical device is referred to herein as the eye-box.

When an image light ray 20 is propagated in waveguide 40 it is reflected at each reflector interaction, however not all of the angular information is relevant to the eye-box and reflector position. Reflector 10 has a flat optical response and removes some energy unnecessarily from the image, causing a degradation that continues with each successive reflector interaction as the image ray propagates along the waveguide. In the extreme case of first and last reflectors, there is only a small angular overlap of the primary image, consequently a lot of light is reflected and lost from the first reflector that is not needed until the latter reflectors.

By way of example, an image light ray 20 impinging on the first reflector 10 has a primary interaction with the first reflector 10 as shown in FIG. 1. Ray 20 is both partially reflected by first reflector 10 and partially transmitted through first reflector 10. Partially reflected ray 20 is reflected from the front of first reflector 10 and directed out of the waveguide via face 41 whereas partially transmitted ray 20 passes through the reflector and is reflected internally by the waveguide face 42. Partially transmitted light ray 20 that has been reflected internally by waveguide face 42 then has a secondary interaction with the back of first reflector 10. This secondary interaction results in the partially transmitted light ray 20 being reflected from the back of the first reflector 10 and directed towards the next reflector(s) 11. Such secondary interactions with the reflector can cause both a loss in image luminance, and a secondary image to be seen by the eye 30 as a result of the light ray reflected from the back of the reflector 10 being reflected out of the waveguide for example by another one of the plurality of reflectors 11 contained in the optical combiner.

The aforementioned optical problems can be mitigated by aspects of the present technology which allow for optical devices and systems that have improved performance over conventional optical waveguides and systems. As will be explained more adequately with reference to embodiments of the present technology, instead of traditional reflective coatings with a flat angular response, a range of angularly selective reflective coatings or other reflectors are contained within the optical waveguide substrate and optimized according to their reflector order within the sequence of reflectors. This configuration of reflectors ensures that the required angular information is passed through to the correct reflector within the sequence. The angular response in addition ensures that no secondary image, or a reduced secondary image, is formed and carried to successive reflectors, which would otherwise result in undesired artefacts.

Optical devices according to embodiments of the present technology will now be described in more detail for use in optical delivery systems including near-eye augmented reality display systems. However, it will be appreciated that in some other embodiments, the optical devices can be configured for other optical delivery systems utilized in imaging and/or non-imaging applications for improved efficiency of targeted illumination schemes.

Figure 2A:
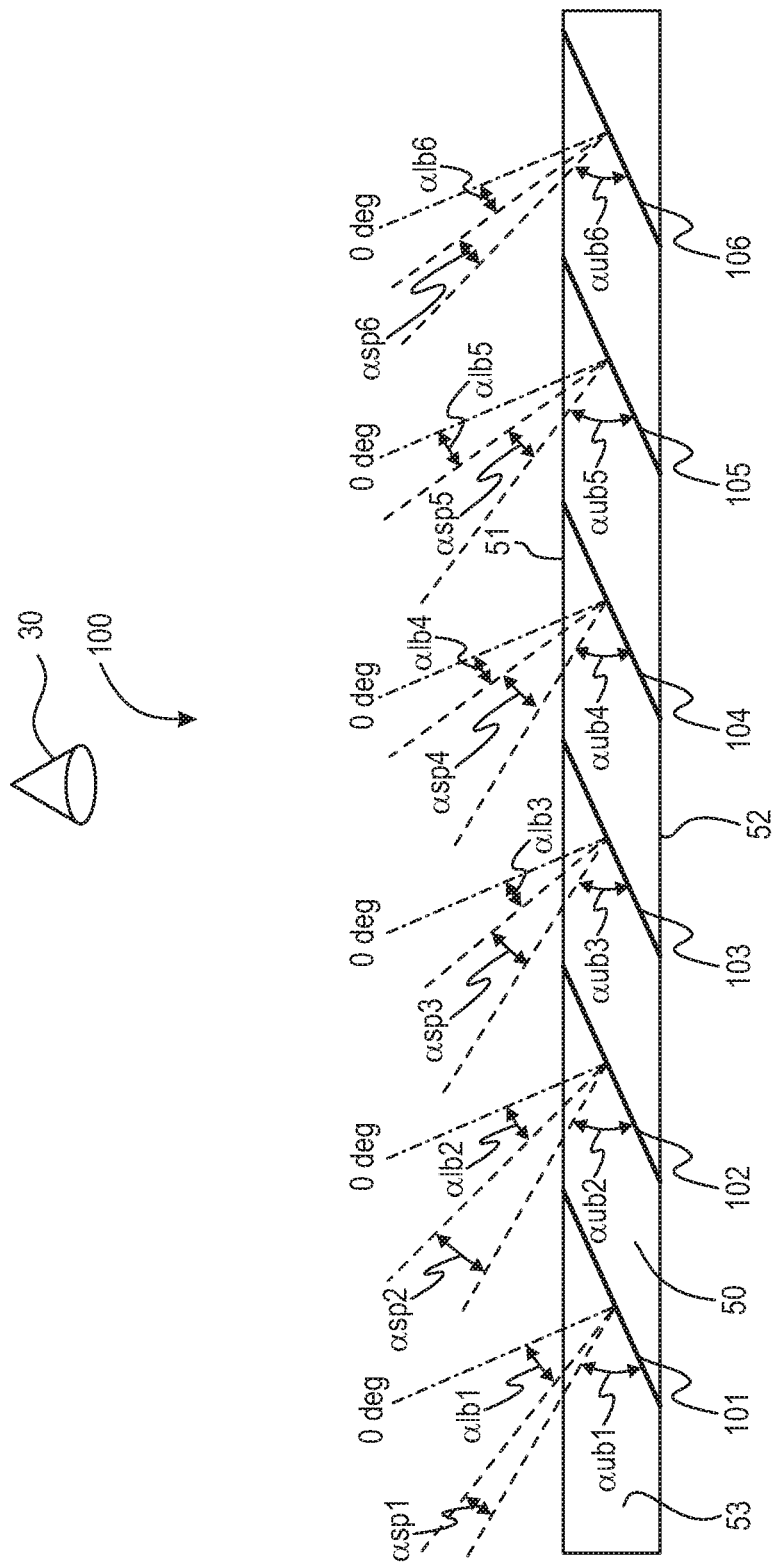
FIG. 2A is side view of an optical device in accordance with an embodiment of the present technology.
Figure 2B:
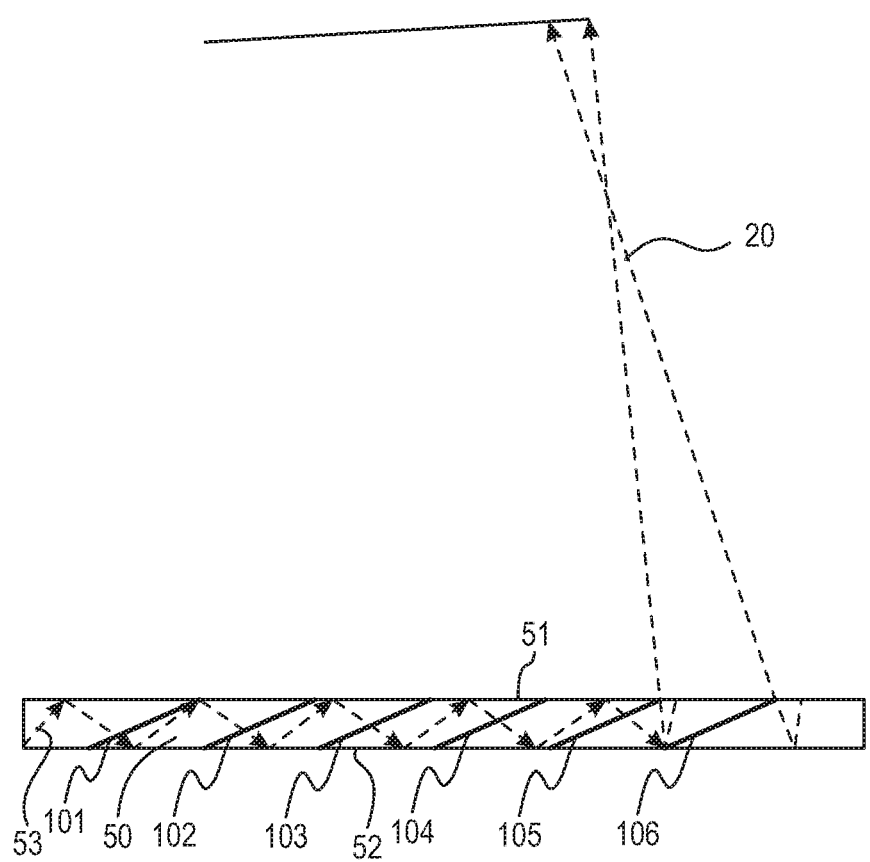
FIGS. 2B to 2G illustrate exemplary ray diagrams, each showing a single ray propagating through the optical device FIG. 2A and having a different ray angle range reaching the eye-box.
Figure 2C:
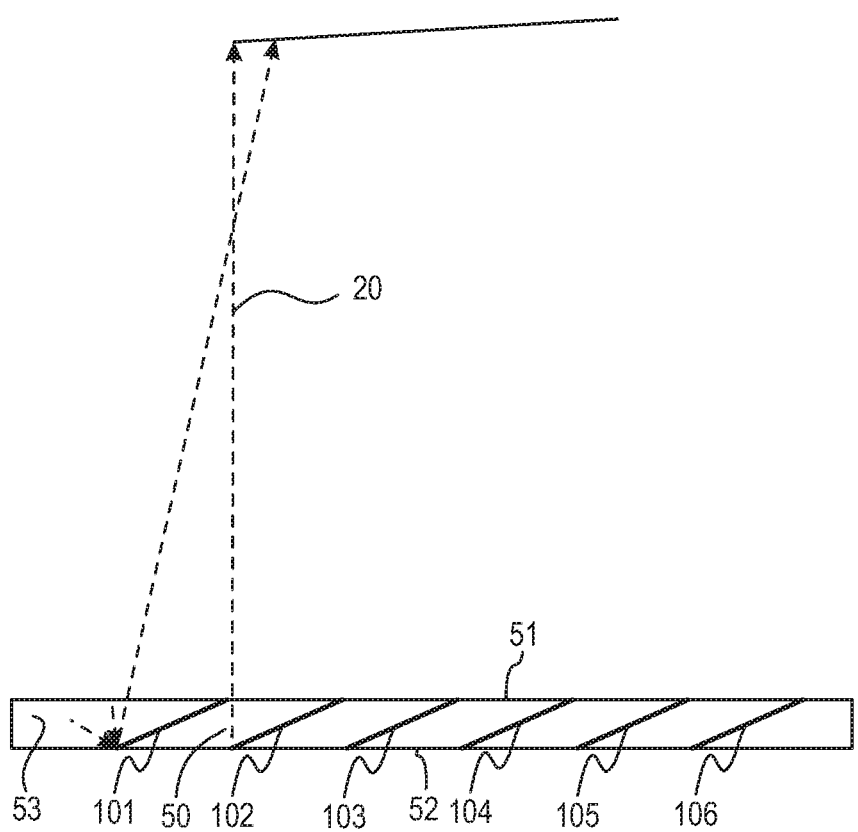
Figure 2D:
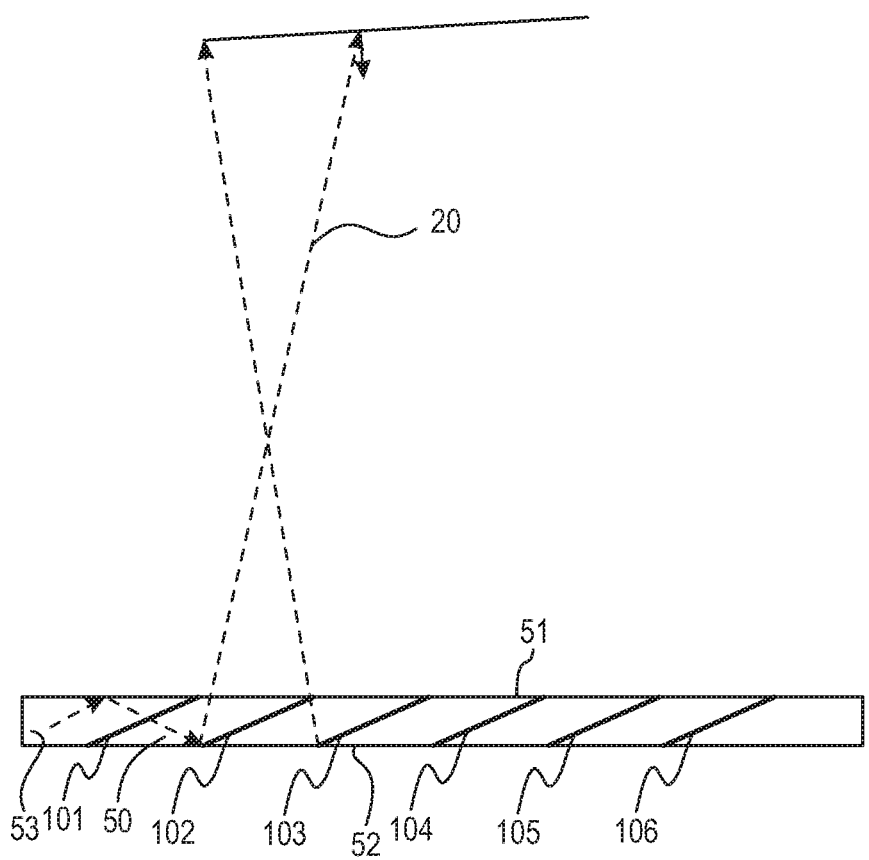
Figure 2E:
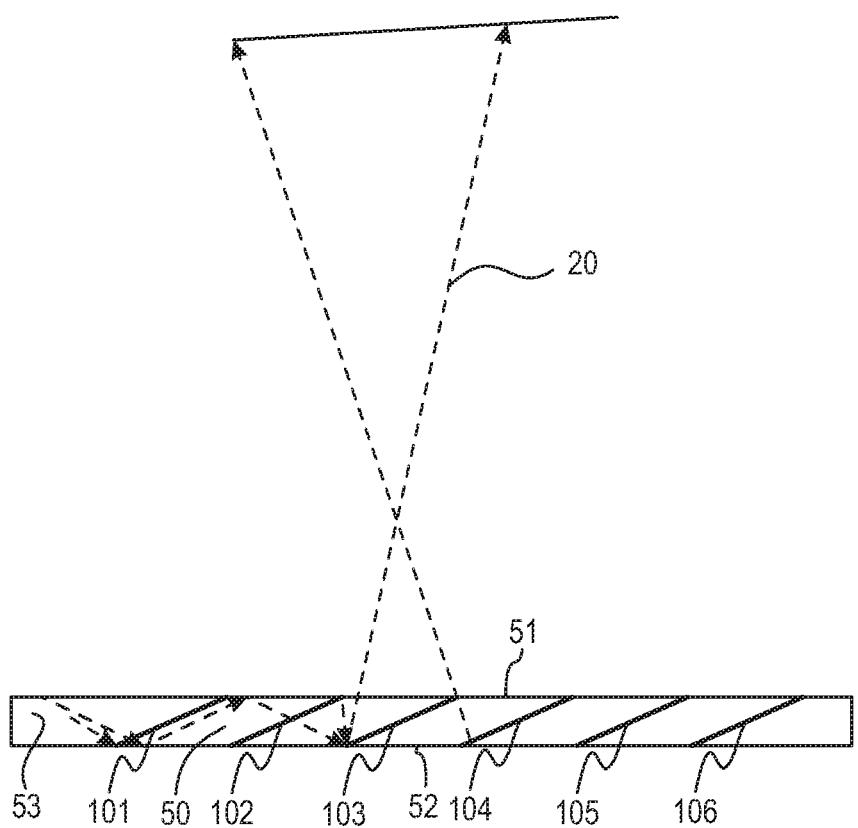
Figure 2F:
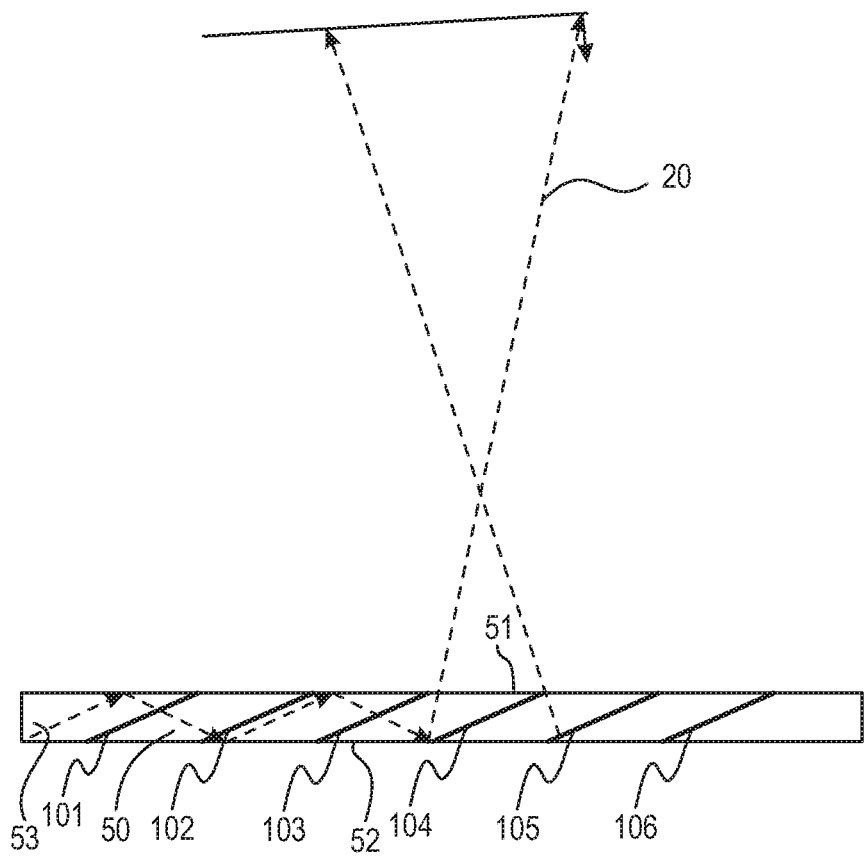
Figure 2G:
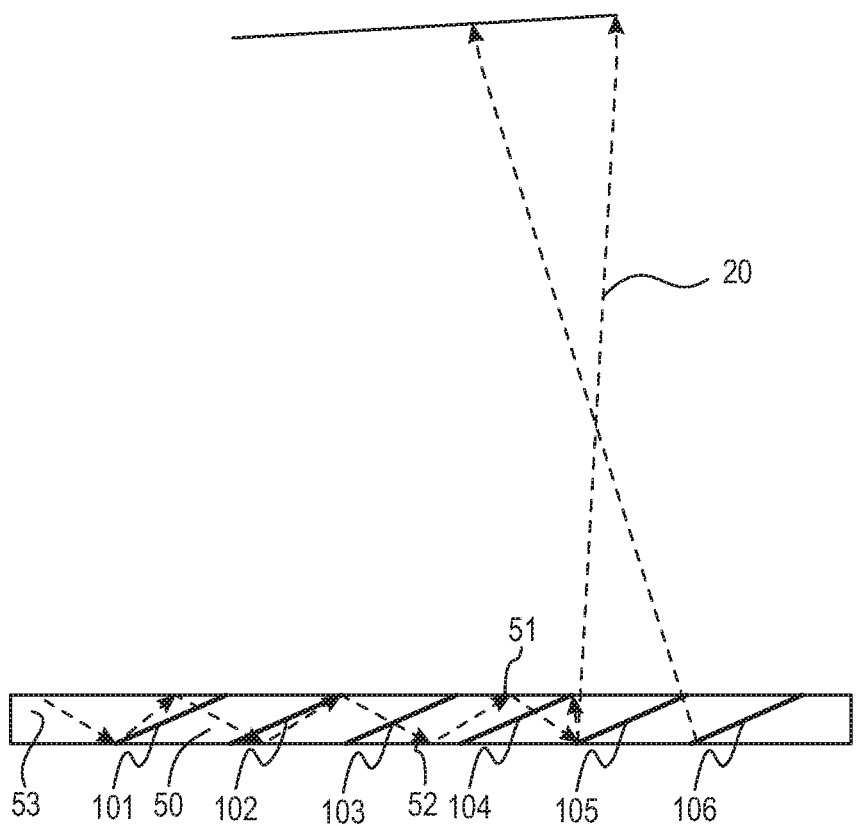

FIG. 2A is a side view of an optical device 100 in accordance with an embodiment of the present technology. Substrate 50 is a see-through substrate made from optical waveguide substrate material such as but not limited to glass, plastic or other suitable materials. In some embodiments, the substrate material may be magnesium aluminate spinel, photonic crystals and/or other optical material. The optical waveguide substrate 50 itself is a slab or planar type waveguide similar to substrate 40. In some other embodiments, the optical waveguide substrate may be other shapes and configurations.

Optical device 100 has plurality of angularly selective reflectors 101-106 contained in the optical waveguide substrate 50. Reflectors 101-106 are generally planar. In some other embodiments, any one or more reflectors may be non-planar. Starting at the image light source end or side 53 of substrate 50, first angularly selective reflector 101, second angularly selective reflector 102, third angularly selective reflector 103, fourth angular selective reflector 105, fifth angularly selective reflector 105 and sixth angularly selective reflector 106 are spatially distributed in a sequence along substrate 50 and inclined in parallel planes. Each reflector 101-106 is orientated in a plane with one axis orthogonal to the light ray propagation angle, and one axis at an angle to the propagation angle such that the internally guided light can be coupled out of the waveguide via front face 51.

The number of angularly selective reflectors may vary according to the desired application and performance and is not limited to the number and/or positions of the reflectors illustrated in FIG. 2A. In other embodiments, any one or more of the angularly selective reflectors are arranged with different spacing and/or in different parallel planes. In yet other embodiments, any one or more of the reflectors are spaced apart unevenly. In yet other embodiments, the reflectors may be arranged in different planes from one another.

Each one of the plurality of angularly selective reflectors 101-106 is configured to reflect over a narrow range of incident angles of light according to the reflector order in the reflector sequence. This ensures that the majority of image light propagating through the optical waveguide substrate 50 that is not required to be reflected at first reflector 101 can continue to one or more successive reflectors 102-106 with only marginally increasing losses, resulting in a net improvement in efficiency.

This type of angularly selective reflector 101-106 is defined herein as an angular selective notch filter optical reflector. The angular selective notch filter optical reflector is a multi-layer dielectric coating or thin film structure. The design and fabrication of multi-layer dielectric layers to achieve a desired optical response is known in the art. By way of example, standard tools including software which enable the design of thin film coatings by inputting the transmittance values and the reflectance values of the reflector requirements may be adopted for providing the reflectors from reflector coatings with the required optical profiles. Examples of such thin film coating design software includes but is not limited to Essential Macleod, LightMachinery Thin Film Cloud, Optilayer, FTG FilmStar. Such software can be adopted to generate prescriptions for coating machines for the purpose of fabricating the multi-layer dielectric coatings. The angle of incidence of the light as it approaches the back surface of the reflector in the waveguide is much larger compared to the angle of incidence approaching the front surface, and affords the opportunity to tailor reflectors made from reflective coatings that can selectively reflect or not—the higher angles of incidence being ones to transmit rather than reflect. The optical angular response of the angular selective notch filter optical reflector is tuned to provide the required angular response by configuring the multi-layer dielectric coating according to multi-layer dielectric optical filter design methods. In some other embodiments, the reflectors can be any other kind of reflector according to known, or future discovered, designs or configurations that are capable of providing the required notch filter angular response and optical characteristics of the present technology discussed herein.

The required optical response of each specific angular selective notch filter optical reflector according to the reflector order in the sequence of reflectors of the optical device can be determined by computer modelling and simulation according to the particular imaging application, as will be explained in more detail below with reference to a specific example. An experimental set-up may be adopted for the purpose of testing the fabricated coatings, as necessary.

As best indicated in FIGS. 2A and 3-5, each angular selective notch filter optical reflector 101-106 is configured to have a selected specific transflectance band $\alpha_{sp}$ between a reduced reflectance upper band $\alpha_{ub}$ and a reduced reflectance lower band $\alpha_{lb}$ (the transitions on either side of the selected specific transflectance band $\alpha_{sp}$ are indicated in dotted line).

Figure 4:
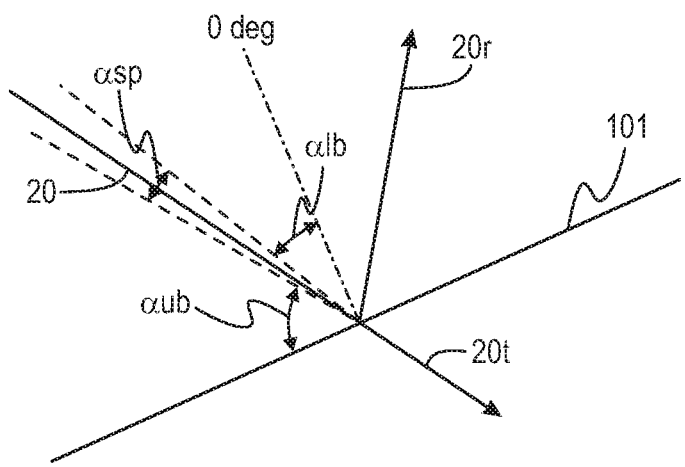
FIG. 4 is a side view of an angular selective notch filter optical reflector shown in FIG. 2 taken in isolation and showing a light ray with an angle incidence which is within the selected specific transflectance band.

The specific selected transflectance band is a band of angles $\alpha_{sp}$ of incidence with respect to the reflector, between specified limits, through which the reflector partially reflects incident light rays whilst allowing the incident light ray to partially pass or partially transmit through the reflector. FIG. 4 is a side view of an angular selective notch filter optical reflector 101 shown in FIG. 2 taken in isolation and showing a light ray 20 at an angle of incidence to reflector 101, within the selected specific transflectance angle limits (so within the selected specific transflectance band $\alpha_{sp}$). As can be seen in FIG. 4, reflector 101 both partially reflects incident light ray 20 and allows light ray 20 to partially pass through reflector 101 thereby resulting in reflected ray 20r and transmitted ray 20t. The required amount of light ray 20 being partially reflected by the reflector versus being partially transmitted will depend on the optical device application requirements. In some alternative embodiments, one or more of the plurality of reflectors has a selected specific reflectance band rather than a selected specific transflectance band meaning that incident light rays having incident angles within the selected specific band are totally reflected by the reflector.

The reduced reflectance lower band is a band of angles $\alpha_{lb}$ of incidence with respect to the reflector, below the specific selected transflectance band $\alpha_{sp}$, through which the reflector stops or reduces incident light rays from reflecting from reflector whilst allowing the incident light ray to pass or transmit through the reflector. In some embodiments, the reduced reflectance lower band is a band of angles $\alpha_{lb}$ of incidence with respect to the reflector below the specific selected transflectance band $\alpha_{sp}$, through which the reflector allows the incident light ray to totally pass or totally transmit through the reflector without reflection. It will be understood that the term totally pass, totally transmit, or fully transmit, used herein with reference to the incident ray passing or transmitting through the reflector means the full amount of the incident light passes or transmits through the reflector to the extent typically permitted in practice allowing for optical losses of the materials etc. which may not necessarily be exactly 100% of the incident light ray.

Figure 3:
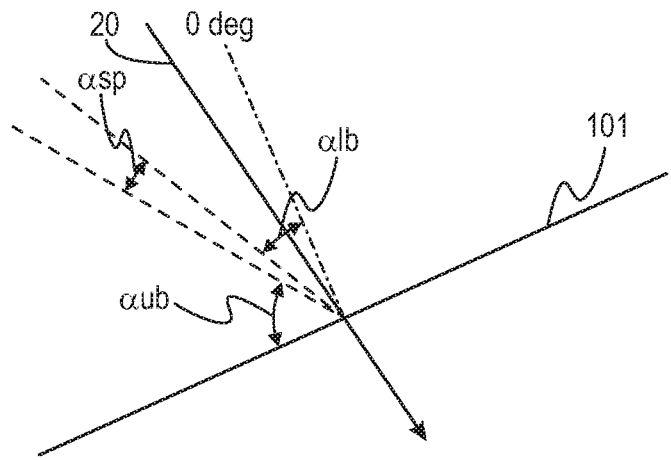
FIG. 3 is a side view of an angular selective notch filter optical reflector shown in FIG. 2 taken in isolation and showing a light ray with an angle of incidence which is below the selected specific transflectance band of the reflector.

In some other embodiments, the reduced reflectance lower band is a band of angles $\alpha_{lb}$ of incidence with respect to the reflector below the specific selected transflectance band $\alpha_{sp}$, through which the reflector minimizes incident light rays from reflecting from the reflector, or reduces the amount by which the incident light rays are reflected compared to the amount by which incident light rays within the specific transflectance band $\alpha_{sp}$ are partially reflected, whilst allowing incident light ray to pass or transmit through the reflector. FIG. 3 is a side view of angular selective notch filter optical reflector 101 shown in FIG. 2 taken in isolation and showing image light ray 20 at an angle of incidence to reflector 101 that is below the specific selected transflectance band $\alpha_{sp}$ of the reflector (so within the reduced reflectance lower band $\alpha_{lb}$). As can be seen in FIG. 3, reflector 101 allows light ray 20 to pass through without any significant reflection.

The reduced reflectance upper band is a band of angles $\alpha_{ub}$ of incidence with respect to the reflector above the specific selected transflectance band $\alpha_{sp}$, through which the reflector stops or reduces incident light rays from reflecting from the reflector whilst allowing the incident light ray to pass or transmit through the reflector. In some embodiments, the reduced reflectance upper band is a band of angles $\alpha_{lb}$ of incidence with respect to the reflector below the specific selected transflectance band $\alpha_{sp}$, through which the reflector allows the incident light ray to totally pass or totally transmit through the reflector without reflection. In some other embodiments, the reduced reflectance upper band is a band of angles $\alpha_{lb}$ of incidence with respect to the reflector below the specific selected transflectance band $\alpha_{sp}$, through which the reflector minimizes incident light rays from reflecting from the reflector, or reduces the amount by which the incident light rays are reflected compared to the amount by which incident light rays within the specific transflectance band $\alpha_{sp}$ are partially reflected, whilst allowing the incident light ray to pass or transmit through the reflector.

It will be understood that the term reduces used herein with reference to reducing the amount of reflection from the reflector of incident light rays having an angle of incidence within the band of angles of the reduced reflectance lower and/or upper band(s) is defined herein to mean reducing by some significant amount the incident light reflected from the reflector compared to the reflected amount of incident light having an angle of incidence within the selected transflectance band $\alpha_{sp}$. The aforesaid significant amount of reduction in reflectance of the incident light reflected from the reflector compared to the reflectance of the reflector in the selected transflectance band $\alpha_{sp}$ is any amount of reduction in reflectance, and any corresponding or other increase in transmission through the reflector, that is sufficient to provide a notch angular response for each reflector in the waveguide and to the extent necessary to provide an improved efficiency for targeted illumination schemes compared to known optical devices that adopt flat response reflectors in waveguides. It will be understood that the term minimizes used herein with reference to minimizing the amount of reflection from the reflector of incident light rays having an angle of incidence within the band of angles of the reduced reflectance lower and/or upper band(s) is defined herein to mean reducing as far as practical, taking in to consideration optical losses of the optical materials etc., the amount of the incident light reflected from the reflector compared to the reflected amount of incident light having an angle of incidence within the selected transflectance band $\alpha_{sp}$.

Figure 5:
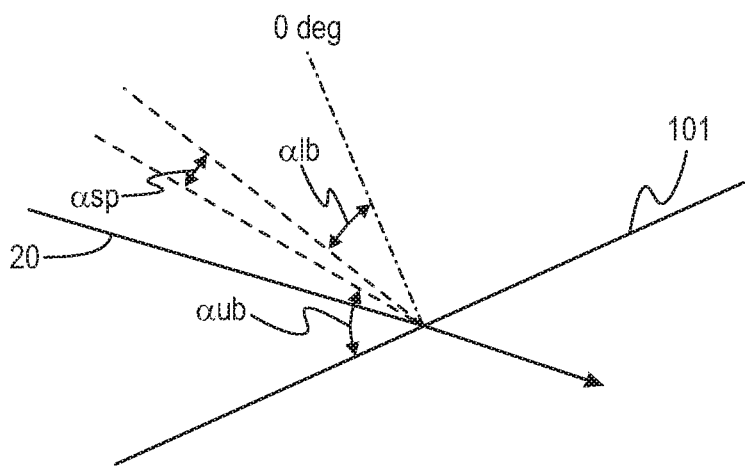
FIG. 5 is a side view of an angular selective notch filter optical reflector shown in FIG. 2 taken in isolation and showing a light ray with an angle of incidence which is above the selected specific transflectance band.

FIG. 5 is a side view of angular selective notch filter optical reflector 101 shown in FIG. 2 taken in isolation and showing light ray 20 at an angle of incidence to reflector 101, above the selected specific transflectance angle limits (so within the reduced reflectance upper band $\alpha_{ub}$). As can be seen in FIG. 5, reflector 101 reduces reflection of incident light ray 20 whilst generally passing or transmitting the light ray 20 through reflector 101.

In some embodiments, the reflective and transmission characteristics of the front and rear of one or more of the reflectors 101-106 are the same or substantially the same. In some other embodiments, the reflective and transmission characteristics of the front and rear of one or more of the reflectors 101-106 are substantially different. In some embodiments, the reduction in reflection of incident light rays from the reflector in the reduced reflectance lower and/or upper bands is associated with a corresponding increase in transmission of the incident light rays through the reflector. In yet some other embodiments, the reduction in reflection of incident light rays from the reflector in the reduced reflectance lower and/or upper bands may not be associated with a corresponding increase in transmission of the incident light rays through the reflector. In yet some other embodiments, the incident light rays in the specific transflectance band of one or some of the reflectors is substantially reflected without any, or with minimal transmission through the reflector(s).

As indicated in FIG. 2, each angular selective notch filter optical reflector 101-106 is configured such that light rays 20 having angles of incidence with respect to the reflector which are in a specific transflectance band or range selected for that particular reflector are both partially reflected from the reflector and partially transmitted through the reflector whereas light rays having angles of incidence above the selected specific transflectance band and light rays having angles of incidence below the specific selected transflectance band are transmitted through the reflector without any significant reflection or with reduced reflection. The overall angular response of the optical device is optimized by configuring each angular selective notch filter optical reflector 101-106 with an angular response according to the reflective order of reflectors 101-106 within the sequence of reflectors such that the majority of image light propagating through the optical waveguide substrate 50 that is not required to be reflected at the first reflector can continue to the next reflector and so on. By way of example of the angular responses of the reflectors 101-106 of the optical device of FIG. 2A.

FIGS. 2B to 2G illustrate exemplary ray diagrams, each showing a single ray propagating through the optical device and having a different ray angle reaching the eye-box as a result of a different angle of incidence of the light ray with respect the reflectors 101-106.

Figure 6:
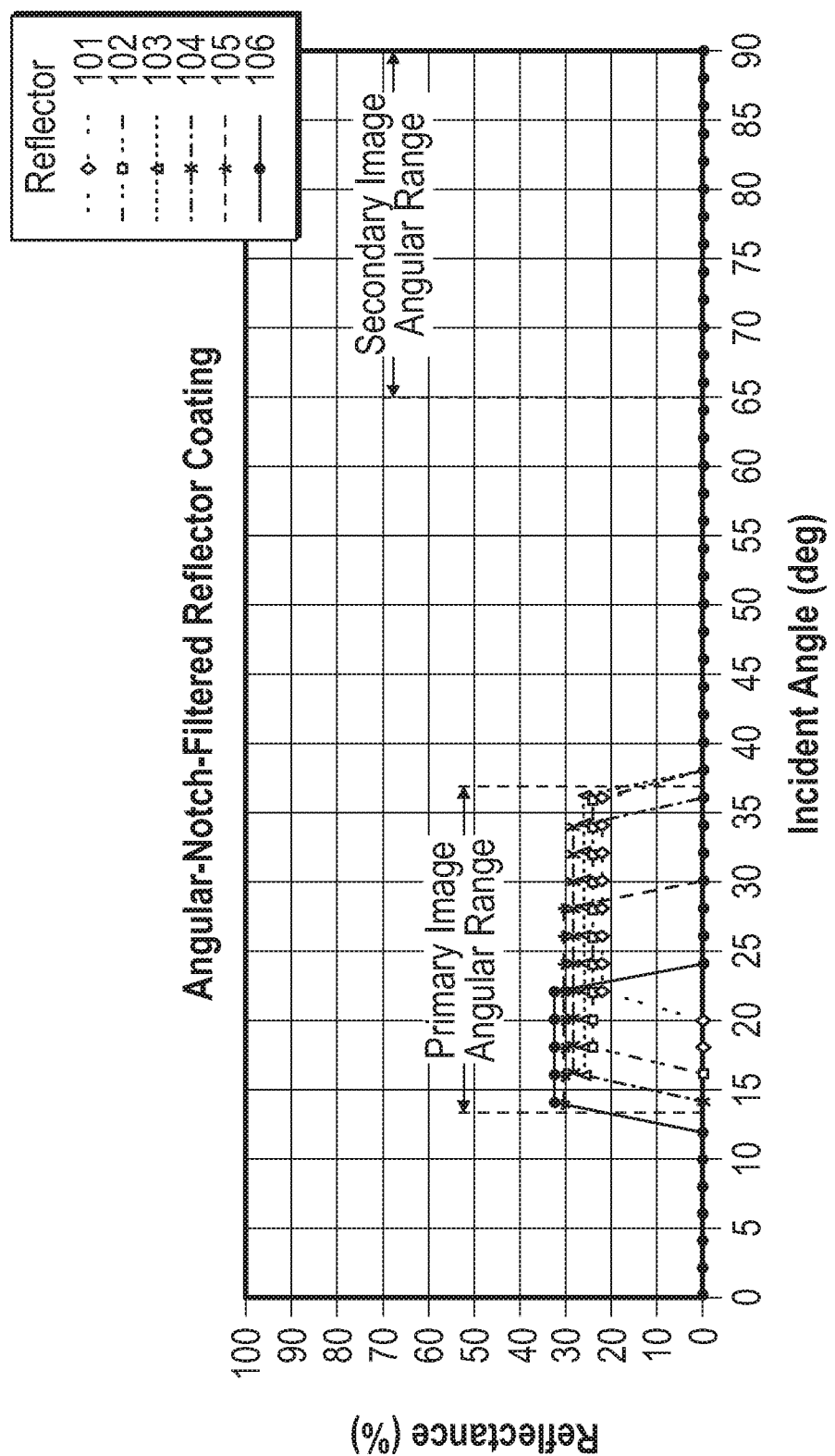
FIG. 6 is a graph illustrating reflectance dependence on light ray incident angle for each one of the plurality of angular selective notch filter optical reflectors of the optical device of FIG. 2 according to one embodiment.
Figure 7:
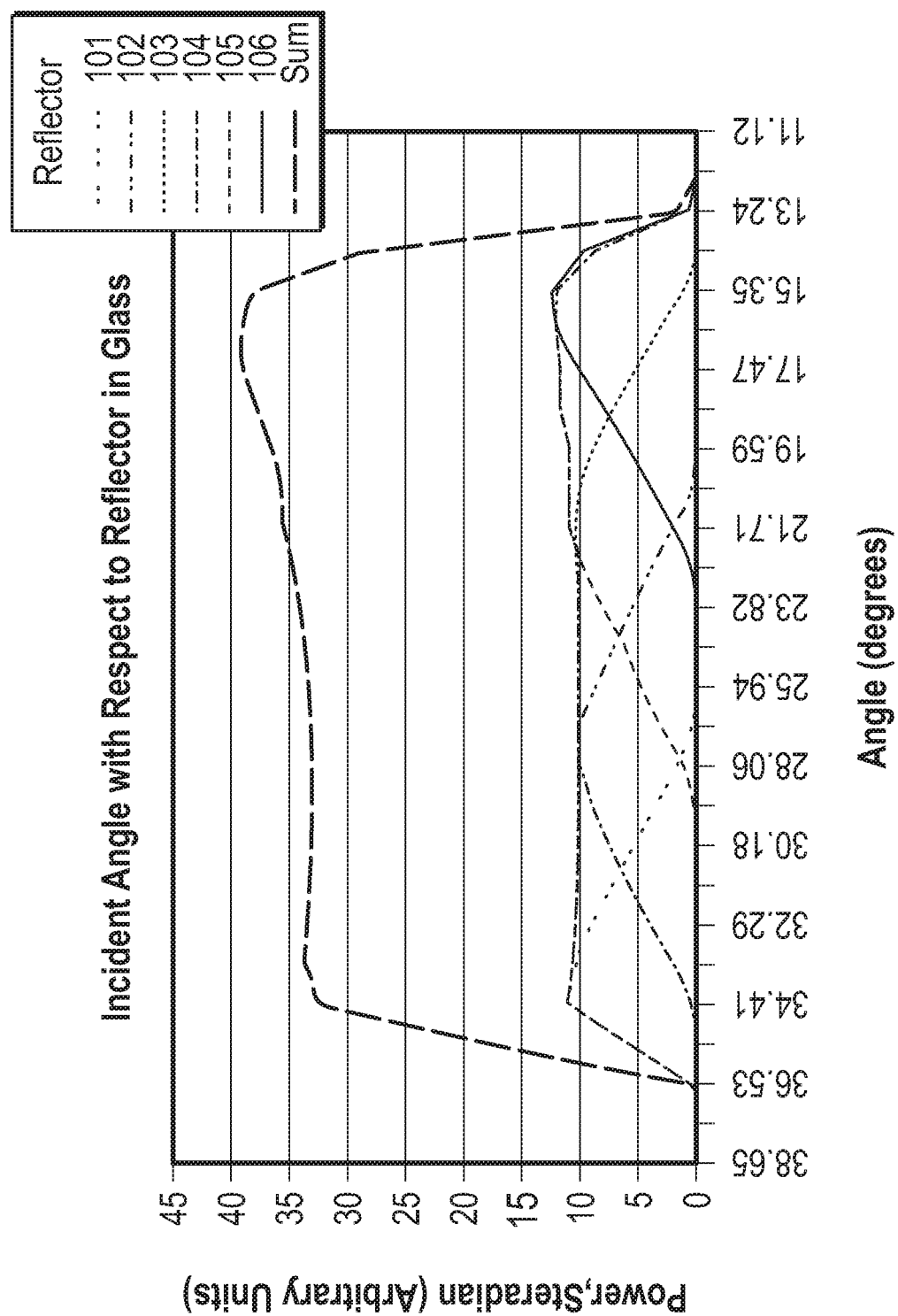
FIG. 7 is a graph illustrating the net angular response of the optical device of FIG. 2 as seen at the eye according to one embodiment.

Reflector angular response optimization results in the optical devices achieving any one or any combination of the following: improved display efficiency, improved display uniformity and reduced or minimized secondary image formation. Improved display efficiency means the display efficiency is improved compared to the display efficiency achieved by optical waveguides that use flat response reflectors. Improved display uniformity means the display uniformity is improved compared to the display uniformity achieved by optical waveguides that use flat response reflectors. Minimized secondary image formation means secondary image formation is reduced to the extent possible due to practical optical limitations of the materials and design as compared to secondary image formation caused by known optical waveguides that use flat response reflectors in the waveguide. Reduced secondary images means secondary images reduced by some amount that is recognizable by the eye of a typical ordinary user of the optical system as compared to secondary image formation caused by optical devices that use flat response reflectors in the waveguide FIG. 6 is a graph illustrating a reflectance dependence on light ray incident angle of each one of the plurality of angular selective notch filter optical reflectors 101-106. Each reflecting surface is individually tuned for selecting specific incident light rays according the reflector sequence in the optical device. FIG. 7 is a graph illustrating the net angular response for the optical device as seen at the eye.

In other embodiments of the optical device, the selected angular response of each reflector 101-106 and net overall angular response of the optical device will be different from that shown in FIGS. 6 & 7 as this will depend on the various optical device properties such as the geometry of the optical waveguide and reflectors, the reflector relative positions, the optical substrate material and the desired system performance for the particular optical application.

In some embodiments, the selected specific transflectance band of angles $\alpha_{sp}$ may not be the same for each reflector (see by way of example FIG. 2 and FIG. 7). In some embodiments, the selected specific transflectance band $\alpha_{sp}$ of at least some of reflectors 101-106 are different from one another. In some embodiments, the angle ranges or angular bandwidth of the selected specific transflectance bands $\alpha_{sp}$ of at least some of reflectors 101-106 are different from one another. By way of example, in FIG. 2, the angular bandwidth of selected specific transflectance band $\alpha_{sp1}$ of first reflector 101 is narrower than the bandwidths of the selected specific transflectance bands $\alpha_{sp2-6}$ of successive reflectors 102-106. In some embodiments, the angular positions of the selected specific transflectance bands of at least some of reflectors 101-106 are different from one another. By way of example, in FIG. 2, selected specific transflectance band $\alpha_{sp1}$ of reflector 101 is positioned at a higher angle of incidence than the selected specific transflectance band $\alpha_{sp6}$ of reflector 106. In some embodiments, the angular position and/or the angular bandwidth of the selected specific transflectance band of at least some reflectors are similar to one another.

As explained hereinbefore the optical device of embodiments can be configured in any type of optical delivery system for improving efficiency in illumination schemes. According to some aspects of the present technology, the optical devices are configured as optical combiners for imaging systems, such as near-eye augmented reality display systems, resulting in any one or any combination of improved display efficiency, improved display uniformity and minimization or elimination of secondary image formation compared to optical systems that use flat response reflectors.

Figure 8:
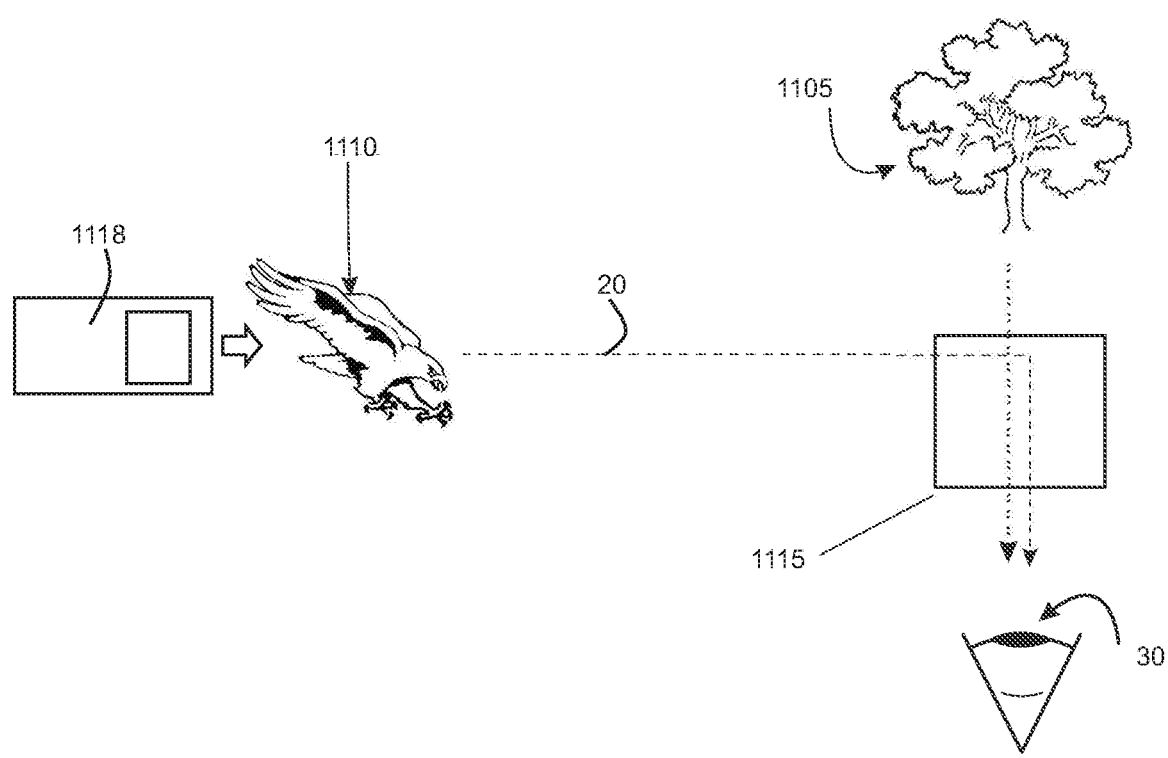
FIG. 8 is a schematic diagram of an augmented reality image display system according to one embodiment.

According to some aspects, a near-eye augmented reality display system is provided that incorporates the optical device of any one of the embodiments identified herein. The optical device serves as the augmented reality optical combiner for combining augmented reality images and real world scenes. FIG. 8 is a schematic diagram outlining an augmented reality image system according to one embodiment. As indicated by FIG. 8, the augmented reality image system includes a computer generated image source or image producing display engine 1118, such as an image projector, and an augmented reality image combiner 1115. Optical combiner 1115 is the optical device 100, or any one of the suitable embodiments thereof described herein, that is configured to overlay the real world scene 1105 with an optically projected computer generated image 1110 and relay the combined image into the eye or eyes 30 of an observer. The plurality of angular selective notch filter optical reflectors of the optical device are arranged in such a way that, when the optical combiner is in use, the received computer generated optical image is reflected and the formed primary image is superimposed on the real world scene view.

Figure 13:
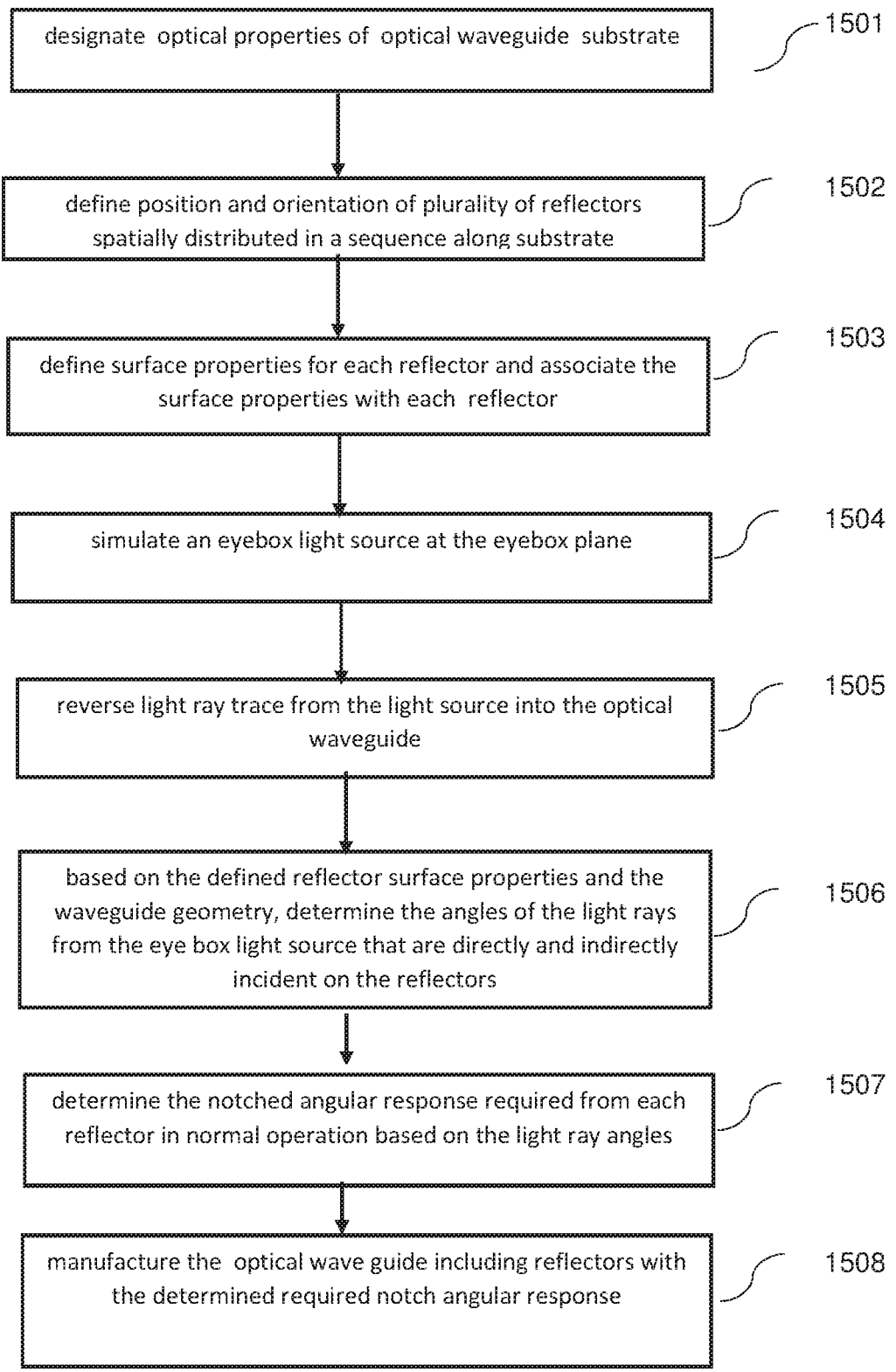
FIG. 13 is a flow chart of a method for use in forming an optical device according to one embodiment.

Due to the large number of rays required to determine the appropriate angular responses at each reflector, and overall complexity when multiple reflector interactions need to be considered, a method of determining the optical profiles of the reflectors of the optical device is required. FIG. 13 is a flow chart representing a method for use in forming any one of the optical devices of the embodiments. The method can comprise a computer implemented simulation method of determining optical profiles of reflectors for an augmented reality optical combiner according to one embodiment. Optical properties of the optical waveguide substrate are provided 1501. The properties may be provided by designating in the computer receiving geometry and other optical properties of the waveguide substrate via a user interface operably connected to the computer. The position and orientation of the plurality of reflectors spatially distributed in a sequence along the optical waveguide substrate are also defined in the computer 1502. Surface properties for each reflector are defined and associated by the computer to the surface properties of each reflector 1503.

The computer simulates a light source at the eye-box plane 1504. The computer reverse traces light rays from the light source into the optical waveguide 1505. Based on the defined reflector surface properties and the wave guide geometry, the computer determines the angles of the light rays from the eye-box light source that are directly and indirectly incident on the reflectors 1506. The computer then determines the maximum or optimized angular notched response required for each reflector 1507. Optionally, the method can include forming or manufacturing the optical device including reflectors having the determined optimized or required angular notched response for each reflector 1508. The optional method step 1508 of forming or manufacturing the optical device can comprise providing the required or optimized selective notch filter angular response reflectors; providing optical waveguide material; and spatially distributing the selective notch filter angular response reflectors in a sequence along a substrate formed from the optical waveguide material. The optical waveguide substrate can be manufactured using known techniques. In some embodiments, each reflector with the determined angular response is fabricated by configuring, using a coating machine, a multi-layer dielectric coating to provide the desired angular response. Each multi-layer coating reflector with the required angular response is embedded or assembled, using known techniques, into the optical waveguide substrate in sequence to form the optical device. In some embodiments of the methods, the optical device is an augmented reality optical combiner device and the optical waveguide substrate is an augmented reality optical waveguide substrate of the type described herein with reference to embodiments of the optical device or other type of augmented reality device.

It would be understood that in some other embodiments, one or more of the method steps 1501-1508 or other method steps described herein may be omitted or may be reordered. In some other embodiments the method of forming or manufacturing the optical device is performed independently of the computer-simulation method steps.

Figure 9:
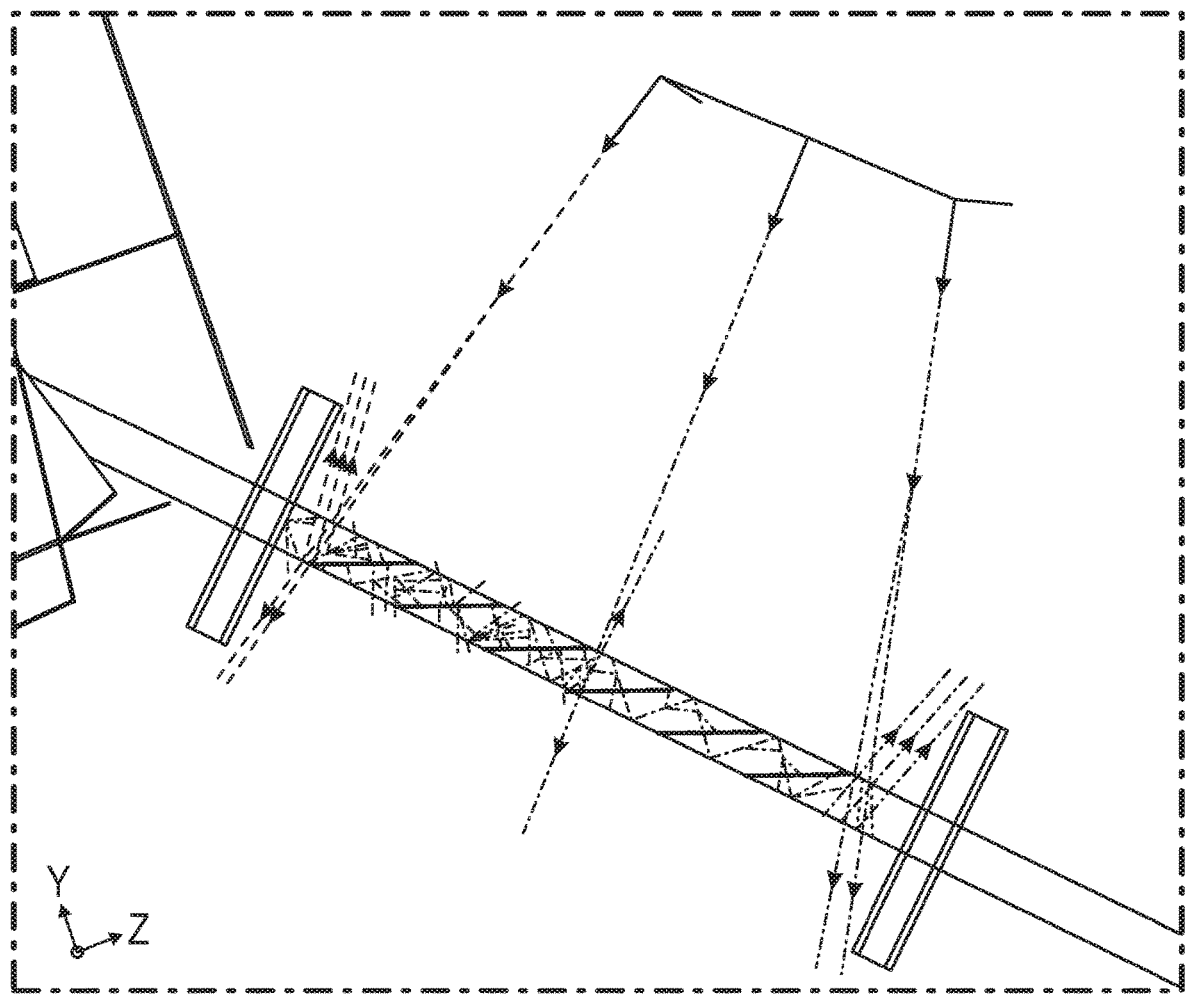
FIG. 9 is a schematic illustrating a computer model set-up for determining the desired angular profile of each reflector of the optical device of FIG. 2 according to one embodiment.

By way of example of the computer implemented simulation method steps of 1501 to 1507 of FIG. 13, reference is made to FIG. 9 which is a schematic illustrating the computer model set-up for pre-determining the optical profile of each of reflectors 101-106 of the optical device 100 for use as the optical combiner in near-eye augmented reality displays according to one embodiment. The eye-box plane is used as a source to reverse ray trace into the guide. This cuts out illumination and imaging systems and significantly reduces the number of guided interactions, reducing model time to less than 10%. In some embodiments, for performance analysis, actually modelling is performed with a test pattern image—and the detector surface image, if placed at the eye position in front of the waveguide, allows observation of the effects of a waveguide on an image. This detector information can be presented in a conventional 2D map, or in angular space. Detector surface properties are associated with each coated reflective boundary within the waveguide medium. From each detector, which is a surface property associated with each reflector, defined within the computer modelling package, the computer determines the ray angles that are directly and indirectly incident onto the reflectors from the eye-box. These are equivalent to the rays that are ideally required to exit from the reflectors to form an image at the eye-box. Reflected angle out is equivalent to incident angle onto the reflector, so the angular data from this simulation gives the maximum or desired angular response required from the reflector in normal operation.

The first reflector in angular space shows a large peak for rays directly incoming, with a second much smaller peak for rays reflected from the back surface. In a forward direction these rays cannot exist so can be ignored.

Figure 10:
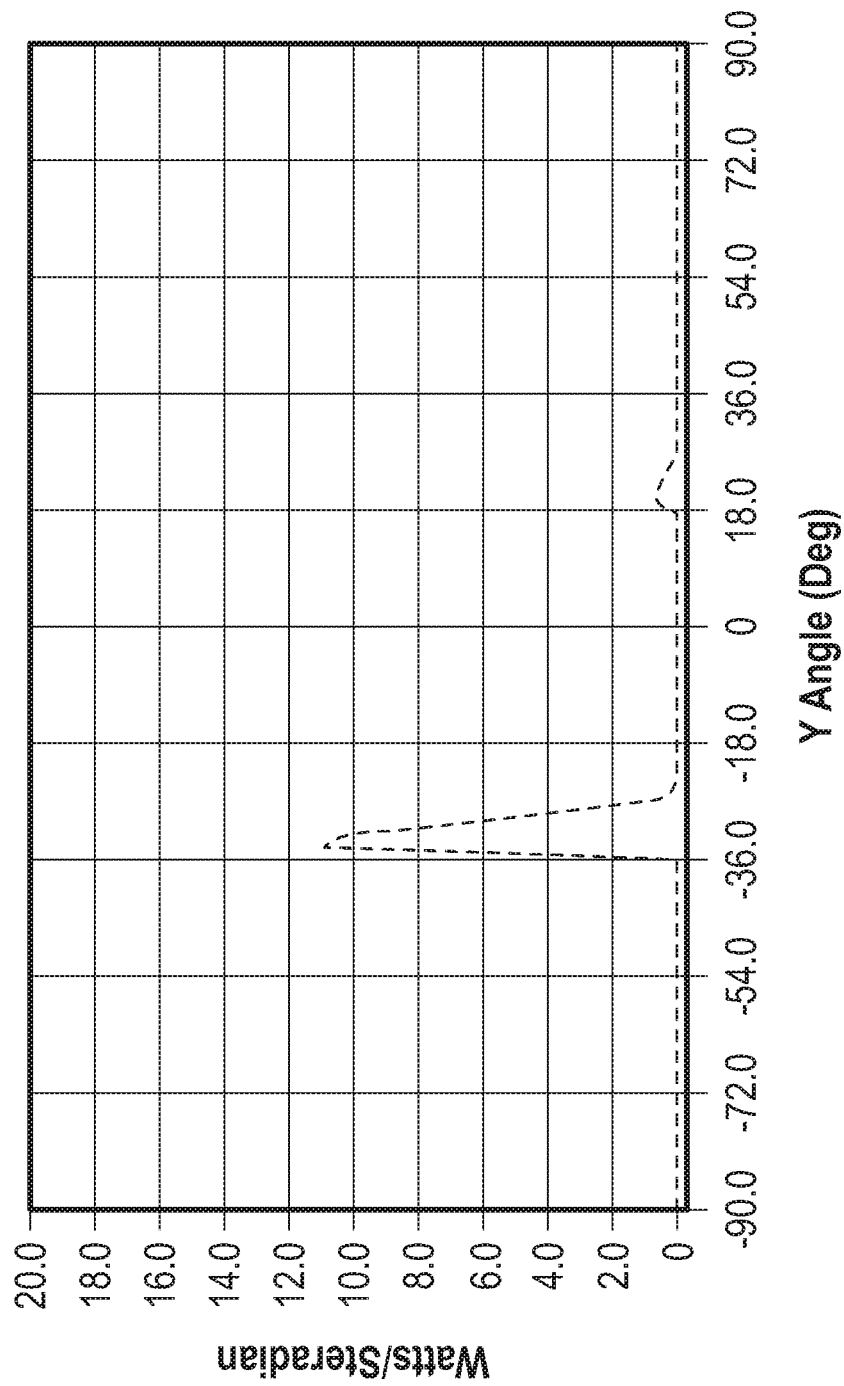
FIG. 10 is a graph illustrating the dependence of relative optical power, measured at an optical detector, on light ray incident angle for a first reflector in the optical device of FIG. 2.

FIG. 10 is a graph illustrating the dependence of relative optical power, that could be measured by an optical detector if such a device could be placed at the reflecting surface, as determined within the computer simulation, on light ray incident angle for a first reflector 101 in the optical device 100. The relative power can be seen to vary over angle, however we are integrating over the entire surface of the reflector so smaller powers may still contribute significantly to edge of eye-box or banding to the adjacent reflector. It is assumed that all the angles with significant power are required, and that the reflectivity is uniform across that range.

Given this modeling output the determined ideal reflector coating optical response of each reflector 101-106 in this example is as follows:
First Reflector 101
Zero to 28 degrees minimize reflection
28 to 37 degrees reflect at chosen reflectance
37 to 90 degrees minimize reflection.
Second Reflector 102
Zero to 22 degrees minimize reflection
22 to 37 degrees reflect at chosen reflectance
37 to 90 degrees minimize reflection.
Third Reflector 103
Zero to 16 degrees minimize reflection
16 to 37 degrees reflect at chosen reflectance
37 to 90 degrees minimize reflection.
Fourth Reflector 104
Zero to 13 degrees minimize reflection
13 to 35 degrees reflect at chosen reflectance
35 to 90 degrees minimize reflection.
Fifth Reflector 105
Zero to 12 degrees minimize reflection
12 to 29 degrees reflect at chosen reflectance
29 to 90 degrees minimize reflection.
Sixth Reflector 106
Zero to 12 degrees minimize reflection
12 to 22 degrees reflect at chosen reflectance
22 to 90 degrees minimize reflection for final reflector (final reflector can reflect or not It will be understood that the reflector coating characteristics provided above are reflection and transmission characteristics for just one exemplary optical device of some embodiments and these vary according to the geometry, material and other optical properties of the waveguide and the target illumination scheme requirements. In some aspects, one or more of the optical devices of some of the embodiments are incorporated as optical combiners in head mounted displays. In some embodiments, a pair of the optical combiners are included in glasses or Goggle form factor augmented reality head mounted displays.

Figure 11:
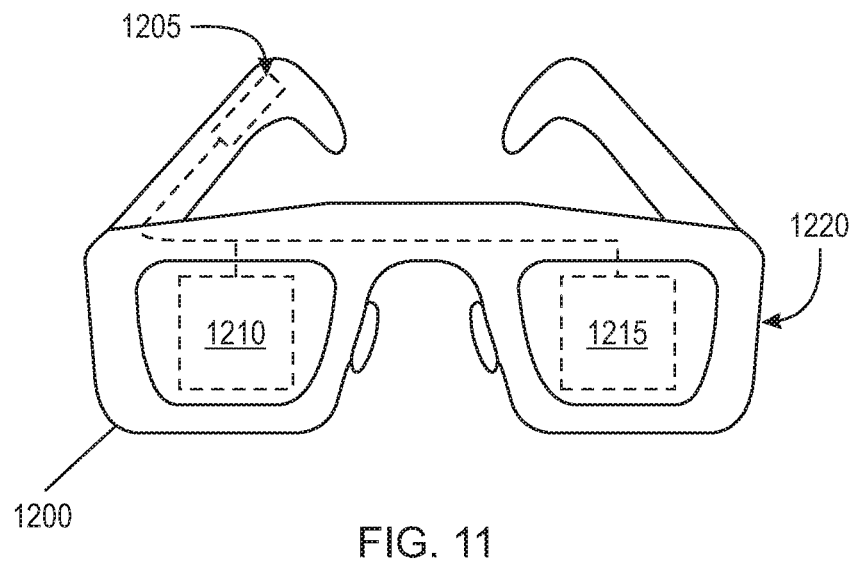
FIG. 11 is a front view of augmented reality head mounted display glasses according to an embodiment.

By way of example, FIG. 11 shows a front view of a pair of the head mounted display glasses according to one embodiment. Glasses or Goggle type head mounted display 1200 has a processing module 1205 generating computer formed images for binocular view. A left eye optical combiner and projection system 1215 and a right eye optical combiner and projection system 1210 are included in the head mounted display.

The optical combiners in the systems 1215, 1210 are the optical devices 100, or any one of the other suitable optical device embodiments described herein, that are configured to overlay the real world scene 1105 with an optically projected computer generated image 1110 and relay the combined image into the eye or eyes 30 of an observer. The reflector profiles have been configured to substantially optimize primary image angular optical information passing to the successive reflectors in the sequence whilst eliminate, minimize or reduce secondary image formation. In some embodiments, the angular response profiles are pre-determined according to the methods described herein. Optical image projector 1118 and optical coupling for example may form part of the projector system. An opto-mechanical frame 1220 holds the optical parts securely and in the correct geometric alignment.

In some embodiments, the formed images are for monocular view and only one of the optical combiner and projection systems 1210, 1215 is included in the head mounted display.

In some embodiments, the head mounted display in which one or more of the optical combiners is incorporated is a helmet form factor augmented reality head mounted display or any other type of head mounted display.

Figure 12:
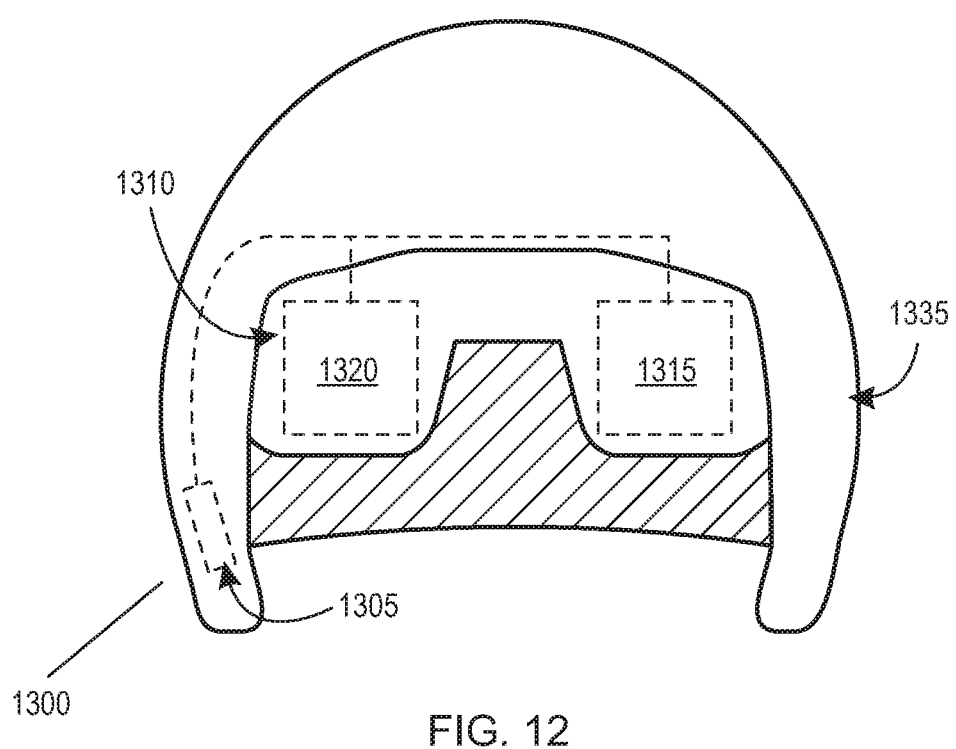
FIG. 12 is a front view of an augmented reality head mounted display helmet according to an embodiment.

By way of example, FIG. 12 shows a front view of a head mounted display helmet according to one embodiment. Helmet head mounted display 1300 has a processing module 1305 generating computer formed images for binocular view. A left eye optical combiner and projection system 1315 and a right eye optical combiner and projection system 1320 are included in the head mounted display.

The optical combiner in each system 1315, 1320 is the optical device 100, or any one of the other suitable optical device embodiments described herein, that is configured to overlay the real world scene 1105 with an optically projected computer generated image 1110 and relay the combined image into the eye or eyes 30 of an observer. The reflector profiles have been configured to substantially optimize primary image angular optical information passing to the successive reflectors in the sequence whilst eliminate, minimize or reduce secondary image formation. In some embodiments, the angular response profiles are determined according to the methods described herein. Optical image projector 1118 and optical coupling may for example form part of the projector system. An opto-mechanical sub frame 1310 holds the optical parts securely and in the correct geometric alignment. Opto-mechanical sub frame 1310 is supported by a mechanically robust shell 1335 of the helmet.

In some embodiments, the formed images are for monocular view and only one of the optical combiner and projection systems is included in the head mounted display.

Figure 14:
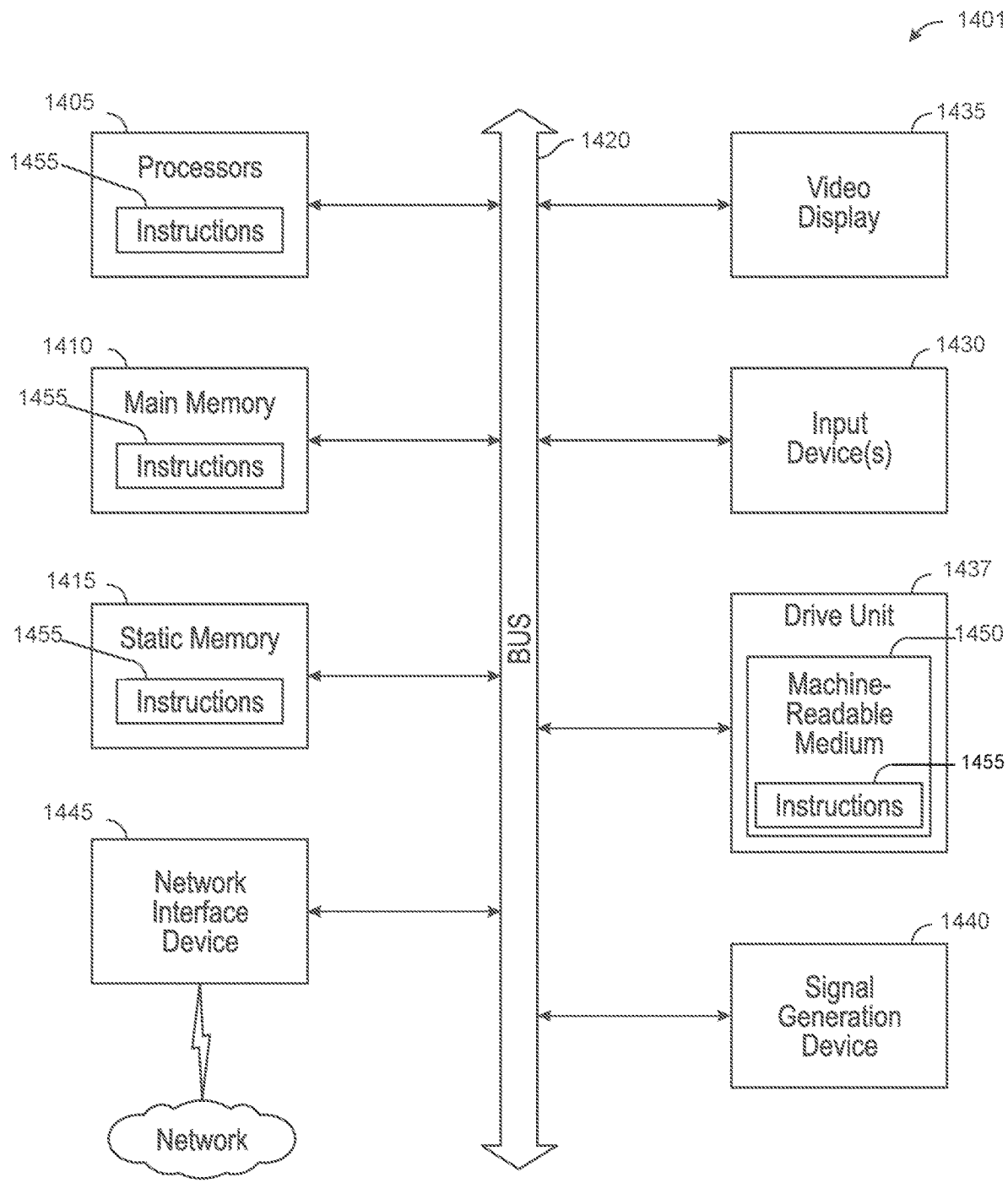
FIG. 14 is an example computing device that can be used to practice aspects of the present technology according to one embodiment.

FIG. 14 is a diagrammatic representation of an embodiment of a machine in the form of a computer system 1401, within which a set of instructions for causing the machine to perform any one or more of the methodologies discussed herein, including the computer-implemented method steps of the method of FIG. 13, may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The embodiment of the computer system 1401 includes a processor or multiple processors 1405 (e.g., a central processing unit (CPU), a graphics processing unit (GPU), or both), and a main memory 1410 and static memory 1415, which communicate with each other via a bus 1420. The computer system 1401 may further include a video display 1435 (e.g., a liquid crystal display (LCD)). The computer system 1401 may also include an alpha-numeric input device(s) 1430 (e.g., a keyboard), a cursor control device (e.g., a mouse), a voice recognition or biometric verification unit (not shown), a drive unit 1437 (also referred to as disk drive unit), a signal generation device 1440 (e.g., a speaker), and a network interface device 1445. The computer system 1401 may further include a data encryption module (not shown) to encrypt data.

The drive unit 1437 includes a computer or machine-readable medium 1450 on which is stored one or more sets of instructions and data structures (e.g., instructions 1455) embodying or utilizing any one or more of the methodologies or functions described herein. The instructions 1455 may also reside, completely or at least partially, within the main memory 1410 and/or within the processors 1405 during execution thereof by the computer system 1401. The main memory 1410 and the processors 1405 may also constitute machine-readable media.

The instructions 1455 may further be transmitted or received over a network via the network interface device 1445 utilizing any one of a number of well-known transfer protocols (e.g., Hyper Text Transfer Protocol (HTTP)). While the machine-readable medium 1450 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1401 are required and thus portions of the computer system 1401 can be removed if not needed, such as Input/Output (I/O) devices (e.g., input device(s) 1430). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

It will be appreciated that various of the above-disclosed and other features and functions, or alternatives thereof, may be desirably combined into many other different systems or applications such as head up type displays. Various presently unforeseen or unanticipated alternatives, modifications, variations, or improvements therein may be subsequently made by those skilled in the art which are also intended to be encompassed by the following claims. For example, the head mounted display sets may be visors, goggles or headband structures and are not limited to the particular types shown in the Figures. Likewise the shape of the optical combiner substrates may be any shape that is capable of guiding and combining images in the manner described hereinbefore.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents

The invention claimed is:

1. A computer-implemented method of determining optical profiles of reflectors for an optical device, the method comprising in a computer simulation:
    designating optical properties of an optical waveguide substrate
    defining a plurality of reflectors spatially distributed in a sequence along the optical waveguide substrate;
    for each reflector, designating surface properties and associating the surface properties with the reflector within the waveguide substrate;
    simulating a light ray source at an eye-box plane;
    reverse tracing light rays from the light ray source into said optical waveguide,
    based on the defined reflector surface properties and the waveguide geometry, determining the angles of incidence of the light rays from the eye-box light source that are directly and indirectly incident on the reflectors;
    and
    determining the optimized or required selective notch filter angular response of each reflector according to the determined angles of incidence of the rays directly and indirectly incident on the reflectors;
    wherein the step of determining the optimized or required selective notch filter angular response of each reflector according to the determined angles of incidence of the rays directly and indirectly incident on the reflectors includes:
    determining the specific transflectance band of each reflector to pass desired angular optical image information to the successive reflectors in the sequence according to requirements of an imaging application; and
    determining portions of the specific transflectance bands of the plurality of optical reflectors all overlap one another at a same angular position in the range of angles of incidence with respect to the reflectors.

2. The method of claim 1, wherein said optical device is an augmented reality optical combiner and wherein said optical waveguide substrate is an augmented reality waveguide substrate.

3. The method of claim 1, wherein defining a plurality of reflectors spatially distributed in a sequence along the optical waveguide substrate comprises:
    defining the plurality reflectors as being disposed in spaced apart parallel planes which are inclined relative to the propagation axis of the optical wave guide substrate.

4. The method of claim 3, wherein the step of for each reflector, designating surface properties and associating the surface properties with the reflector within the waveguide substrate includes:
    designating the optical reflector to have a similar angular response for light rays incident on the front and back, respectively, of the reflector.

5. The method of claim 1, wherein the step of for each reflector, designating surface properties and associating the surface properties with the reflector within the waveguide substrate includes:
    designating at least one of said plurality of reflectors is a multi-layer dielectric coating or thin film.

6. The optical device of claim 1, wherein the step of determining the optimized or required selective notch filter angular response of each reflector according to the determined angles of incidence of the rays directly and indirectly incident on the reflectors includes:
    determining the maximum reflectance of respective selected specific transflectance bands of at least some of the reflectors progressively decreases according to the reflector order in the reflector sequence.

7. The method of claim 1, wherein the step of determining the optimized or required selective notch filter angular response of each reflector according to the determined angles of incidence of the rays directly and indirectly incident on the reflectors includes:
    determining the angular position of respective selected specific transflectance bands of at least some of the reflectors are different from one another.

8. The method of claim 7, wherein the step of determining the optimized or required selective notch filter angular response of each reflector according to the determined angles of incidence of the rays directly and indirectly incident on the reflectors includes:
    determining the angular position of respective selected specific transflectance bands of at least some of the reflectors progressively decrease according to the reflector order in the reflector sequence.

9. The method of claim 1, wherein the step of determining the optimized or required selective notch filter angular response of each reflector according to the determined angles of incidence of the rays directly and indirectly incident on the reflectors includes:
determining the angular range of respective selected specific transflectance bands of at least some of the reflectors are different from one another.

10. A non-transitory computer readable medium with an executable program stored thereon comprising instructions for execution by at least one processor determining optical profiles of reflectors for an optical device, such that the instructions when executed by the at least one processor causes the at least one processor to:
receive designation of optical properties of an optical waveguide substrate
receive a definition of a plurality of reflectors spatially distributed in a sequence along the optical waveguide substrate;
for each reflector, receive designation of surface properties and associating the surface properties with the reflector within the waveguide substrate;
simulate a light ray source at an eye-box plane;
reverse tracing light rays from the light ray source into said optical waveguide,
based on the defined reflector surface properties and waveguide geometry, determine the angles of incidence of the light rays from the eye- box light source that are directly and indirectly incident on the reflectors;
determine the optimized or required selective notch filter angular optical response of each reflector according to the determined angles of incidence of the rays directly and indirectly incident on the reflectors; and
wherein the instructions when executed by the at least one processor further causes the at least one processor to:
determine a specific selective notch filter angular transflectance band of each reflector to pass desired angular optical image information to the successive reflectors in the sequence according to requirements of an imaging application; and
determine portions of the specific transflectance bands of the plurality of reflectors all overlap one another at a same angular position in the range of angles of incidence with respect to the optical reflectors.

11. The non-transitory computer readable medium of claim 10, wherein said optical device is an augmented reality optical combiner and wherein said optical waveguide substrate is an augmented reality waveguide substrate.

12. The non-transitory computer readable medium of claim 10, wherein the instructions when executed by the at least one processor further causes the at least one processor to:
define the plurality reflectors as being disposed in spaced apart parallel planes which are inclined relative to the propagation axis of the optical wave guide substrate.

13. The non-transitory computer readable medium of claim 12, wherein the instructions when executed by the at least one processor further causes the at least one processor to:
designate the reflector to have a similar angular response for light rays incident on the front and back, respectively, of the reflector.

14. The non-transitory computer readable medium of claim 10, wherein the instructions when executed by the at least one processor further causes the at least one processor to:
designate at least one of said plurality of reflectors is a multi-layer dielectric coating or thin film.

15. The non-transitory computer readable medium of claim 10, wherein the instructions when executed by the at least one processor further causes the at least one processor to:
determine the maximum reflectance of respective selected specific transflectance bands of at least some of the reflectors progressively decreases according to the reflector order in the reflector sequence.

16. The non-transitory computer readable medium of claim 10, wherein the instructions when executed by the at least one processor further causes the at least one processor to:
determine the angular position of respective selected specific transflectance bands of at least some of the reflectors are different from one another.

17. The non-transitory computer readable medium of claim 16, wherein the instructions when executed by the at least one processor further causes the at least one processor to:
determine the angular position of respective selected specific transflectance bands of at least some of the reflectors progressively decrease according to the reflector order in the reflector sequence.

18. The non-transitory computer readable medium of claim 10, wherein the instructions when executed by the at least one processor further causes the at least one processor to:
determine the angular range of respective selected specific transflectance bands of at least some of the reflectors are different from one another.

19. A system, comprising:
a processor; and
a memory, the processor executing instructions stored in the memory to:
receive designation of optical properties of an optical waveguide substrate
receive a definition of a plurality of reflectors spatially distributed in a sequence along the optical waveguide substrate;
for each reflector, receive designation of surface properties and associating the surface properties with the reflector within the waveguide substrate;
simulate a light ray source at an eye-box plane;
reverse tracing light rays from the light ray source into said optical waveguide,
based on the defined reflector surface properties and waveguide geometry, determine the angles of incidence of the light rays from the eye- box light source that are directly and indirectly incident on the reflectors;
determine the optimized or required selective notch filter angular optical response of each reflector according to the determined angles of incidence of the rays directly and indirectly incident on the reflectors; and
wherein the instructions when executed by the at least one processor further causes the at least one processor to:
determine a specific selective notch filter angular transflectance band of each reflector to pass desired angular optical image information to the successive reflectors in the sequence according to requirements of an imaging application; and determine portions of the specific transflectance bands of the plurality of reflectors all overlap one another at a same angular position in the range of angles of incidence with respect to the optical reflectors.

20. The system of claim 19, wherein said optical device is an augmented reality optical combiner and wherein said optical waveguide substrate is an augmented reality waveguide substrate.

\* \* \* \* \*